July 21, 1942.  D. O. JOHNSON ET AL  2,290,593
FLUID SEAL
Filed Dec. 16, 1937
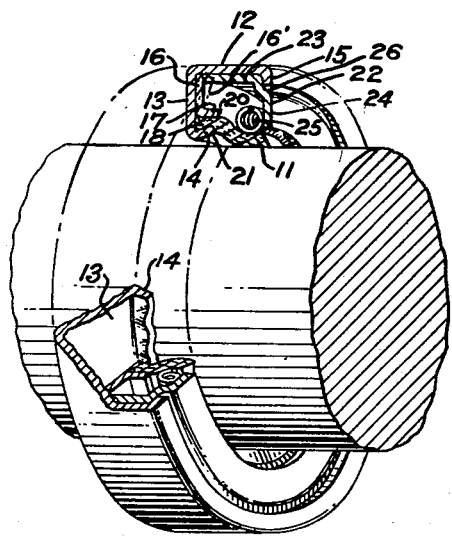
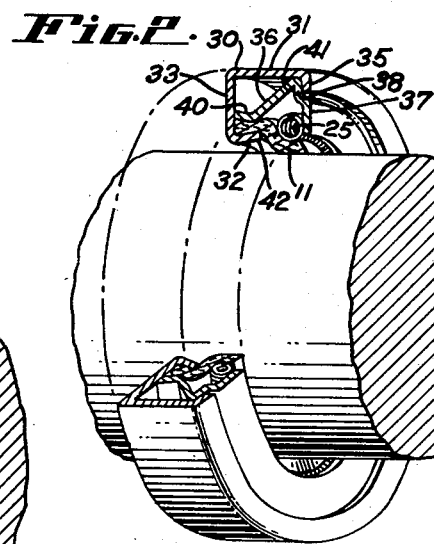
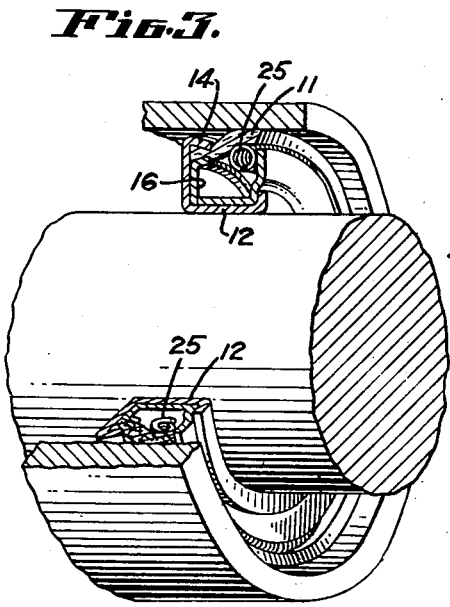
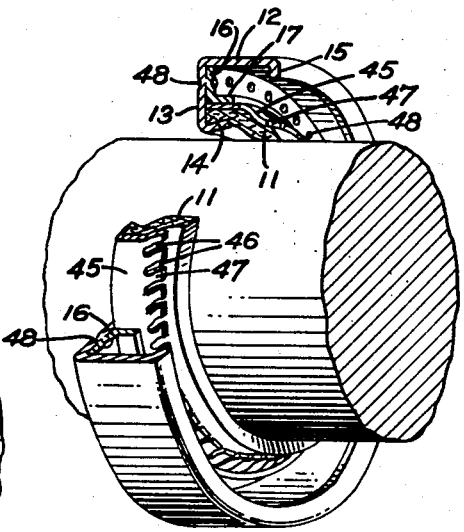
INVENTOR.
DWIGHT O. JOHNSON
A. FRED ANDERSON
BY
ATTORNEY Patented July 21, 1942

2,290,593

UNITED STATES PATENT OFFICE 2,290,593

FLUID SEAL

Dwight O. Johnson and Antone Fred Anderson, Oakland, Calif., assignors to National Motor Bearing Co., Inc., Oakland, Calif., a corporation of California Application December 16, 1937, Serial No. 180,151

5 Claims. (Cl. 288—3)

The present invention relates to fluid seals and more particularly to a fluid seal which is self-contained and which is designed and adapted to be placed around moving shafts or on moving shafts or the like, for the purpose of retaining fluid within a housing from which the shaft projects and preventing the fluid from leaking out along the shaft where seepage normally occurs.

Among other things, it is the object of the present invention to provide a unitary seal structure composed of two or more stampings arranged so that the flexible sealing member may be clamped between two adjacent axially extending flanges formed on a pair of said stampings; to provide a novel form of cage structure permitting assembly of the device after forming of the axial clamping members; to provide a cage construction employing a minimum of parts and relying on the spot welding of its members to maintain the assembly; to provide a novel form of cage structure employing a dished clamping member which tightens its hold when the cage parts are finally assembled; to provide a novel form of cage with parts having pre-formed adjacent axial clamping members which, upon assembly, reform the clamped portion of the sealing member into a keystone shape; and to provide a construction of maximum simplicity, economy and ease of assembly, and such further objects, advantages and capabilities as will later more fully appear and as are inherently possessed by said device.

An important feature of my invention is the use of an outer cage member having a peripheral portion and a short preformed axial portion connected to the peripheral portion by a radial wall, together with a nesting member also having a pre-formed axially extending portion which latter portion effects a squeezing or re-forming of the flexible sealing member when the parts are forced into assembled relation. This accomplishes a secure anchoring of the flexible sealing member in the cage parts, especially where the axially extending flanges are pre-formed to provide an annular groove which is narrow at its mouth. This also accomplishes an important economy from the standpoint of cost of assembly inasmuch as the sealing member is securely clamped without further spinning or forming of the axial flange on the outer cage member. A further economy, both in the time of assembly and in material cost, may be effected by the use of spot welding for securing the inner clamping member against the radial wall of the outer cage.

The invention further resides in the combination, construction and arrangement of parts illustrated in the accompanying single sheet of drawings, in which there is shown a preferred embodiment, together with modifications. It is to be understood that the same are capable of further modification and change without departing from the spirit or the scope of the invention.

Referring now to the drawing:

Fig. 1 is a perspective view of a fluid seal with a segment removed exposing a transverse section;

Fig. 2 is a perspective view of a fluid seal showing a modified form likewise with a segment removed exposing a transverse section;

Fig. 3 illustrates the seal of Fig. 1 in external form adapted to be secured with the cage in non-rotative fit on the shaft and the flexible element sealing against the bore;

Fig. 4 is a perspective view of a fluid seal showing a modified form employing a finger spring. A segment has been removed to expose a transverse section.

It is to be understood that the invention described herein is as readily suited to use when sealing externally as when sealing internally. Figs. 1, 2 and 4 illustrate internal seals, and Fig. 3 shows an external seal. The parts comprising these two types are the same except for reverse positioning of the several flanges. The claims, unless otherwise restricted, are intended to apply equally to external and internal constructions.

Referring now more particularly to the drawing, the seal is retained in a non-rotative position in the housing bore by what is commonly known as a press fit. The outside diameter of the cage on an "internal" seal is made several thousandths oversize to provide a drive fit with the bore. An "external" seal has the inside cage diameter made several thousandths undersize to provide a drive fit when inserting it on the shaft. This drive fit of the cage supports and maintains the leather 11 or other suitable sealing means in sealing position around the shaft so as to confine or dam up whatever lubricant or fluid content may be in the housing and prevents it from escaping along the shaft or at the outer periphery of the seal.

The fluid seal as shown in the internal form in Fig. 1 includes a metal stamping substantially circular in shape having a cylindrical axially extending peripheral flange 12 forming the outer peripheral wall and a spaced irregular axial flange 14 connected by a radially extending portion 13. When assembled the outer radial portion 15 on flange 12 is spun in to hold the parts together. Axial flange 14 is preferably bent inwardly to form an angle less than 90° with radial wall 13. The purpose of this is to have it form one side of a keystone or dovetail joint in which flexible sealing member 11 is held.

A washer 16 adapted to nest within the outer cage is provided with an axial flange 17, the latter being formed at an angle preferably substantially identical with axial flange 14 to form the other side of the keystone or dovetail joint. The mouth of the annular groove 18 formed by axial walls 14 and 17 is the narrowest portion of the groove and is preferably narrower than the thickness of flexible sealing member 11 so as to reform it and clamp it securely. This eliminates an additional assembling operation of moving either wall 14 or 17, or both, closer together after the sealing member 11 has been positioned between them. Also, it insures a leak-tight joint between the sealing member 11 and flange 14.

Thus, the preferable arrangement of the parts so far described in assembling this seal is for the outer cage to be placed with radial wall 13 flat in an assembly jig, sealing member 11 is then placed in position so that it stands upright on radial wall 13 adjacent flange 14. Washer 16 is then placed on member 11 like a bracelet and is forced down around its outside. As axial flange 17 approaches opposite the in-turned edge of axial flange 14, greater force is required to move it the rest of the way because sealing member 11 is being compressed and re-formed to fit the annular dovetail groove 18. When washer 16 is nested in the bottom of the outer cage it is preferable that the edge 20 of flange 17 and edge 21 of flange 14 should lie in a plane substantially parallel with radial wall 13. If there is any substantial difference, then edge 20 should preferably be closer to radial wall 13 than is edge 21. This relieves the tendency for washer 16 to work out of position.

In order to effect a further clamping action on the sealing member 11, washer 16 may be made slightly dished (see dotted lines and reference numeral 16') and of a diameter to provide a snug fit with the outer cage. Thus, when the washer 16 is forced into clamping position and flattened against bottom 13 of the outer cage, the tendency is for axial flange 17 to be contracted about sealing member 11. This is due to the force set up as the washer bears against the inner periphery of axial member 12 and also to the contractive effect on flange 17 of flattening the washer against radial wall 13.

On certain types of seals of this construction, and particularly those where the gap between the shaft and the housing bore through which it projects is substantial, it may be desirable to spot weld washer 16 to radial flange 13 at this stage in the assembly operation before closure member 22 is inserted.

Proceeding now with a further description of the structure shown in Fig. 1, there is provided a case closure member 22 having an axial extending portion 23 and radial portion 24. The latter functions to hold spring 25 on sealing flange 11 and the former functions to hold washer 16 in the bottom of the outer cage member. A recess 26 may be formed in member 22 to receive spunover portion 15 and give a smooth radial face to the assembled cage.

The sealing member 11 is formed of a tubular flexible stock and extends substantially co-axially with the shaft being sealed. One end is in axial contact with the shaft and the other end is held in its axial position in the cage member.

Fig. 3 shows a seal of similar construction modified only to adapt it to service as an external seal. Like reference characters are used to designate similar parts. Spring 25, instead of being the contracting type is an expanding type to urge sealing member 11 against the wall of the housing bore. Peripheral surface 12 of the outer cage member is adapted for press fit on the shaft or other moving part. No further description is believed necessary of this construction or its assembly in view of the above detailed explanation in connection with Fig. 1.

The modified form shown in Fig. 2 combines the features of this invention in a two-piece cage. The outer cage 30 is formed with a peripheral portion 31, with short axial flange 32 connected by a radial wall 33. The peripheral edge 35 is adapted to be spun over to hold the parts in assembled relation.

The flexible sealing member 11 is of the tubular type having one end in contact with the shaft and the other end secured in the axial clamping groove of the cage.

An annular dished clamping member 36 is formed of a size suitable to nest within outer cage member 30. It is comprised of the radial closure wall 37, connecting wall 38, and axial flange 40. A recess 41 may be formed between 37 and 38 to receive spunover portion 35 and make possible a smooth radial end to the cage.

Axial flange 40 formed on the end of connecting wall 38 is inclined in the opposite direction to axial flange 32 so that these flanges 40 and 32 form an annular groove wider at its base than at its mouth. It is preferable that the bend connecting flange 40 with wall 38 should come opposite the edge 42 of flange 32 for the reason pointed out in connection with Fig. 1.

In assembling this construction of oil seal the outer cage 30 is placed on a flat assembly jig with radial wall 33 downwardly. Sealing member 11 is stood on the inside of radial wall 33 adjacent radial flange 32.

The dished annular clamping member 36 is then started down around the outside of sealing member 11 and before closing wall 37 reaches the end of sealing member 11, garter spring 25 is placed around the latter. As clamping member 36 is forced further downwardly on sealing member 11, radial wall 40 presses and reforms sealing member 11 lying between it and axial flange 32, with the result that when axial flange 40 has been forced into contact with radial wall 33 the clamping end of sealing member 11 has been reformed into a dovetail joint taken in cross section.

The next step in the assembly of this seal is to spin peripheral edge 35 over onto annular clamping member 36. Usually, considerable force is employed in this spinning operation, and dished annular clamping member 36 is pushed hard against radial wall 33 resulting in contraction of the mouth of the annular clamping groove around sealing member 11. In Fig. 2, the angle of dished wall 38 is shown as about forty-five degrees to the shaft. It may be more or less depending upon the amount of contraction desired for flange 40. The greater the angle with respect to the shaft, the more the contraction possible.

While it is not illustrated, this seal construction may be employed in an external type seal with the parts simply reversed so that the axial clamping flange is on the outside instead of the inside, and an expanding type spring 25 is used.

The modification shown in Fig. 4 is in many respects like the construction shown in Fig. 1 and differs in the omission of the closure member 22, and in the type of spring employed on the sealing member 11. For this reason the same reference numerals will be used where they apply.

In this construction the clamping washer 16 is preferably made slightly dished (see dotted line position and reference numeral 16') with an outside diameter when so dished which fits snugly against the inner periphery of cage wall 12, so that when washer 16 is pushed down against radial wall 13, axial flange 17 is contracted around finger spring 45 and sealing member 11. The effect is to increase the grip on sealing member 11.

The construction shown in Fig. 4 is best adapted to use with what is known in the art as a finger spring, which comprises a substantially flat spring steel strip formed into an open annulus 45 having transverse slits 46 extending partway in from one edge to form the fingers 47. These fingers press on sealing member 11 and urge it into sealing contact with the shaft. Finger spring 45 is placed around sealing member 11 during the assembly operation and washer 16 slides into position over the finger spring. The base of the finger spring is clamped in the annular groove between flanges 17 and sealing member 11.

With this seal as with the others, it is preferable that the mouth of the annular clamping groove should be narrower than the width of sealing member 11 so that irrespective of any contraction of washer 16 sealing member 11 will be securely anchored. When washer 16 is forced down into the bottom of the cage, and substantially flat against radial wall 13, these parts are preferably united by means of spot welding, indicated by the spots 48 where the metal has united.

In order to give additional body to peripheral wall 12, its outer edge may be flanged at 15.

The above described constructions and other modifications thereof which will occur to the man skilled in the art have the common feature of clamping the sealing member 11 between inclined pre-formed axial flanges, and of effecting a further tightening of the axial clamping flange as the dished inner washer is put under stress as explained.

What we claim is:

1. A unitary fluid seal adapted for press fit insertion to seal the space between moving parts having cylindrical faces, comprising a cage member having a peripheral surface for press fit engagement with a cylindrical face, and having a radial portion, said radial portion having its edge adjacent the surface to be sealed bent to form an axial flange inclined slightly away from said last named surface, a flexible sealing member extending substantially co-axially of the cylindrical face being sealed and having one end adjacent the inside surface of said axial flange, and a one piece self-tightening clamping member comprising a complementary axial flange substantially concentric with the aforesaid axial flange, a radial end closure wall, said flange and said wall being formed integral with a dished washer which bears on its opposite edge against the inner periphery of said cage member whereby the further said washer is pushed into the cage the tighter will be the hold on the sealing member.

2. A unitary fluid seal adapted for press fit insertion to seal the space between moving parts having cylindrical faces, comprising a cage member having a peripheral surface for press fit engagement with a cylindrical face, and having a radial portion, said radial portion having its edge adjacent the surface to be sealed bent to form an axial flange inclined slightly away from said last named surface, a flexible sealing member extending substantially co-axially of the cylindrical face being sealed and having one end adjacent the inside surface of said axial flange, and an annular clamping washer comprising a web extending between the opposite corners of said cage member and having an axial flange complementary to the flange on said cage formed on its rim adjacent the sealing member.

3. A unitary fluid seal adapted for press fit insertion to seal the space between moving parts having cylindrical faces, comprising a cage member having a peripheral surface for press fit engagement with a cylindrical face, and having a radial portion, said radial portion having its edge adjacent the surface to be sealed bent to form an axial flange inclined slightly away from said surface; a flexible sealing member extending co-axially of the cylindrical face being sealed and having one end adjacent the inside surface of said axial flange; and a dished clamping washer adapted to nest in the bottom of said cage member and having an axial flange formed adjacent the axial flange on the latter, a cage closure member also nesting within said cage and having an axially extending portion in contact with said clamping washer and a radially extending portion closing the open end of said cage.

4. A unitary fluid seal adapted for press fit insertion to seal the space between moving parts having cylindrical faces, comprising a cage member having a peripheral surface for press fit engagement with a cylindrical face, and having a radial portion, said radial portion having its edge adjacent the surface to be sealed bent to form an axial flange, a flexible sealing member extending substantially co-axially of the cylindrical face being sealed and having one end adjacent the inside surface of said axial flange, and an annular clamping washer comprising a web extending between the opposite corners of said cage member and having an axial flange complementary to the flange on said cage formed on its rim adjacent the sealing member.

5. A unitary fluid seal adapted for press fit insertion to seal the space between moving parts having cylindrical faces, comprising a cage member having a peripheral surface for press fit engagement with a cylindrical face, and having a radial portion, said radial portion having its edge adjacent the surface to be sealed bent to form an axial flange, a flexible sealing member extending substantially co-axially of the cylindrical face being sealed and having one end adjacent the inside surface of said axial flange, and an annular clamping washer comprising a web extending from one corner of said cage diagonally in the general direction of said axial flange and having a cooperating flange complementary to the flange on said cage supported by said web.

DWIGHT O. JOHNSON.
ANTONE FRED ANDERSON.